US012682044B1

(12) United States Patent
Kulkarni et al.

(10) Patent No.: US 12,682,044 B1
(45) Date of Patent: Jul. 14, 2026

(54) SYSTEM AND METHOD FOR CONDUCTING OPERATIONAL FLOW FORENSICS

(71) Applicant: FireEye Security Holdings US LLC, San Jose, CA (US)

(72) Inventors: Neeraj Kulkarni, San Ramon, CA (US); Nallu Sethuraman, Concord, NC (US)

(73) Assignee: Musarubra US LLC, Plano, TX (US)

( * ) Notice: Subject to any disclaimer, the term of this patent is extended or adjusted under 35 U.S.C. 154(b) by 449 days.

(21) Appl. No.: 18/143,462

(22) Filed: May 4, 2023

(51) Int. Cl.
 *G06F 21/54* (2013.01)
 *G06F 21/55* (2013.01)

(52) U.S. Cl.
 CPC ............ *G06F 21/54* (2013.01); *G06F 21/554* (2013.01)

(58) Field of Classification Search
 CPC ............................... G06F 21/554; G06F 21/54
 See application file for complete search history.

(56) References Cited

U.S. PATENT DOCUMENTS

| | | | | | |
|---|---|---|---|---|---|
| 10,887,328 | B1 * | 1/2021 | Paithane | .................. | G06F 21/54 |
| 11,093,613 | B2 * | 8/2021 | Walters | ................. | G06F 21/577 |
| 2013/0232323 | A1 * | 9/2013 | Lerouge | .................. | G06F 21/14 |
| | | | | | 712/E9.045 |
| 2017/0192810 | A1 * | 7/2017 | Lukacs | .................... | G06F 21/56 |
| 2019/0286822 | A1 * | 9/2019 | Munetoh | ............. | G06F 11/3495 |
| 2024/0028724 | A1 * | 1/2024 | Parla | .................... | G06F 11/3616 |

* cited by examiner

*Primary Examiner* — Linglan Edwards
*Assistant Examiner* — Jacob Benedict Knackstedt
(74) *Attorney, Agent, or Firm* — Rutan & Tucker, LLP; Kyle M. St. James

(57) ABSTRACT

Disclosed herein is an algorithm selector logic for determining an operational flow of operating system (OS) components. The algorithm selector logic features data retrieval logic, emulation logic, trace generation logic and software component selection logic. The data retrieval logic retrieves a targeted memory structure for an OS component. The emulation logic conducts emulation operations on the OS component. The trace generation logic inserts intercept points at memory address offset locations that correspond to parameters within the targeted memory structure to generate a trace. The software component selection logic compares an execution flow associated with the generated trace with known execution flows, where the known execution flows are associated with different OS versions. When correlation between the execution flow and the known execution flows are not in correlation, the software component selection logic identifies the OS component may be compromised or further analytics of the OS component is required.

13 Claims, 8 Drawing Sheets

SYSTEM AND METHOD FOR CONDUCTING OPERATIONAL FLOW FORENSICS

FIELD

Embodiments of the disclosure generally relate to the field of threat detection. More specifically, one embodiment relates to a memory forensics detection system to uncover and/or analyze undocumented and/or unknown memory structures featuring software components for threat analysis and determining operational flow.

GENERAL BACKGROUND

Cybersecurity attacks have become a pervasive problem for organizations as many networked devices and other resources have been subjected to attack and compromise. A cybersecurity attack (also referred to as a "cyberattack") constitutes a threat to security, which may involve the infiltration of certain types of content into a network device. For example, various memory structures of an operating system (OS) have become a common attack vector for different types of cyberattacks. One type of cyberattack is a malware attack, where software with the intent to perpetrate malicious or criminal activities (referred to as "malware") infiltrates the OS installed on a networked device. This type of cyberattack is intended to negatively impact the recipients, ranging from unintended financial impact (e.g., monetary loss, loss of financial information, etc.), a social impact (e.g., exfiltration of information intended to embarrass, harass or blackmail, threats in posting certain content, etc.), or even more serious impacts.

Based on focused cyberattacks on security vulnerabilities in operating systems (OSes), OS developers have implemented Application Programming Interfaces (APIs) from which endpoint detection and response (EDR) developers can extract relevant information for security analysis. Because security information retrieved via known APIs may be tainted by malware and therefore is unreliable, memory audits have been used to extract reliable, relevant security information. However, the memory audits are difficult to perform, given the use of undocumented memory structures by OS developers. The effectiveness of a memory audit in identifying cyberthreats is correlated to an analyst's ability to classify what data types are maintained within the undocumented memory structures, which include undocumented memory structures that are known to exist as well as undocumented memory structures that are currently unknown but provide amble information for cyberthreat analytics. To support the rapid development of effective detection and response on endpoints for classifying undocumented memory structure, a new memory auditing scheme is necessary.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
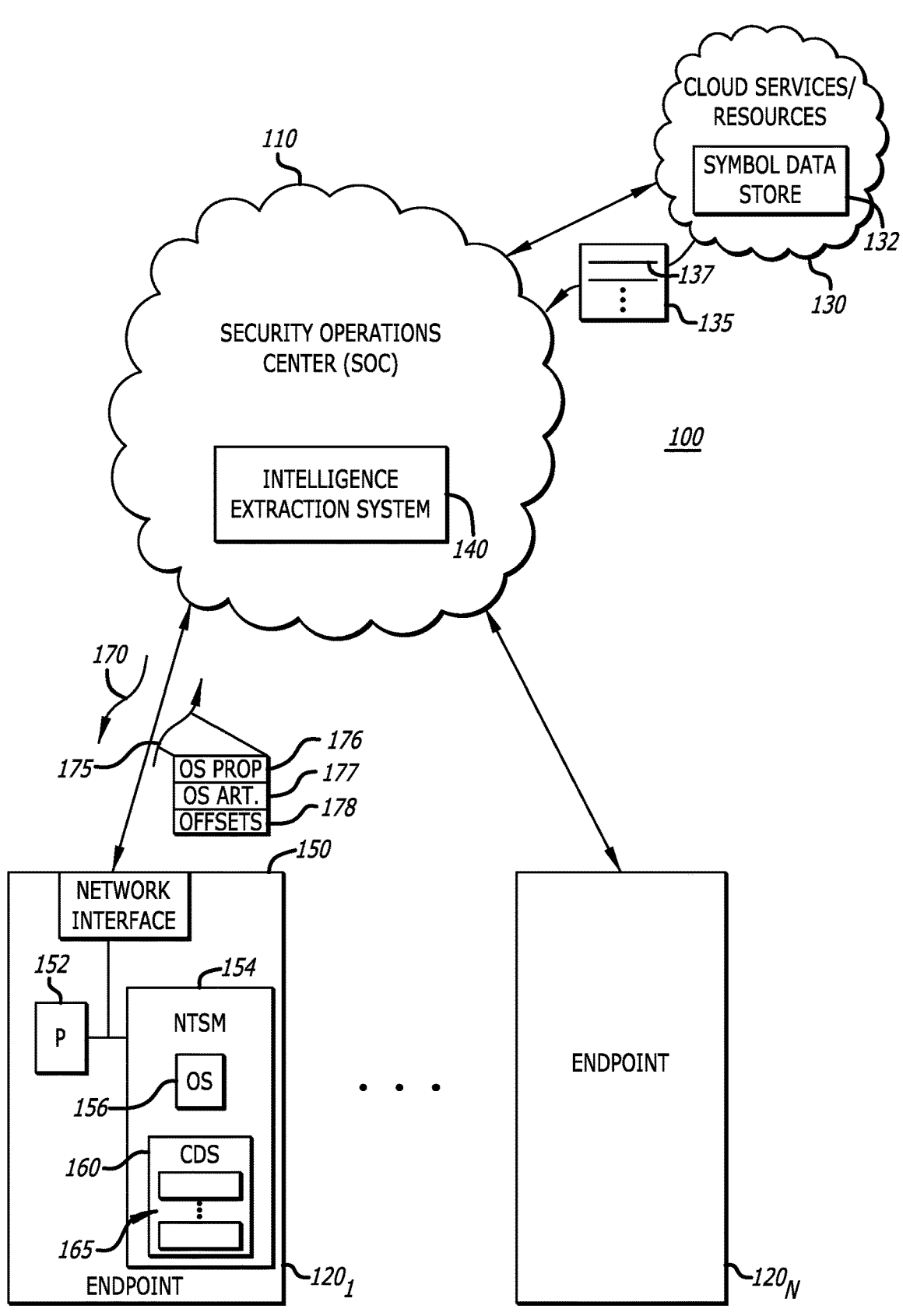
FIG. 1 is a block diagram illustrating an exemplary embodiment of a networking environment featuring computing devices (endpoints) that are each connected to analytical service, such as a security operation center.

Various embodiments of the disclosure relate to a cyberthreat security system that features an intelligence extraction system and security controls such as one or more cyberthreat detection systems. Deployed within a targeted computing device or deployed to operate in concert with one or more targeted computing devices (hereinafter, "targeted computing device(s)"), a cyberthreat detection system is configured to detect cyberthreats such as malware residing within memory of the targeted computing device(s). More specifically, the cyberthreat detection system is configured to utilize content provided from the intelligence extraction system to conduct analytics on memory within the targeted computing device(s) to determine whether the targeted computing device(s) have been compromised.

According to one embodiment of the disclosure, the intelligence extraction system is configured to perform real-time analytics, in an automatic fashion (e.g., with no or substantially limited human interaction), on memory structures associated with one or more targeted computing devices. More specifically, the real-time analytics may be used to identify undocumented (and sometimes unknown) memory structures utilized by operating system (OS) components installed within the targeted computing devices. After identification, the content of these memory structures, namely the OS components, may be analyzed by the cyberthreat detection system to uncover potential cyberthreats and identify any compromised memory structures.

Remotely located from the targeted computing devices, the intelligence extraction system may be deployed in a hosted service, such as a cloud-based hosted service, a dedicated network service, a locally hosted service, or any combination thereof (e.g., a hybrid deployment). The intelligence extraction system operates by conducting memory forensics to gain knowledge concerning the memory infrastructure of one or more computing devices serviced by the intelligence extraction system. By understanding the memory infrastructure, such as the memory structure of the OS for example, cyberthreat analyses may be conducted to determine whether the OS is or has been subjected to a cyberattack. The memory forensics may include identifying content associated with OS components within specified memory structures and comparing this content with content associated with OS components retrieved via designated Application Programming Interface(s). Differences may suggest that the API(s) and/or OS memory has or have been compromised.

As an illustrative example, the intelligence extraction system may be deployed as part of a security operations center (SOC), namely a dedicated network service adapted to receive and process information provided directly or indirectly from data sources for use in memory forensics. The data sources may include networked sources (e.g., OS vendor servers accessible by the SOC, cloud services, etc.), targeted computing device(s), and/or cyberthreat detection system(s) operating to protect the computing device and/or a private network (enterprise) to which the targeted computing device(s) are connected. The cyberthreat detection system may include, but are not limited or restricted to endpoint software agent or other cyberthreat detection system (e.g., firewall, malware detection system, intrusion detection system, etc.). The information gathered from the different networked sources may vary, such as symbols from the OS vendor along with OS-specific properties (e.g., OS manufacturer, version, etc.) from the cyberthreat detection systems themselves.

According to one embodiment of the disclosure, the intelligence extraction system includes undocumented structure extractor logic, undocumented offset extractor logic, and algorithm selector logic. Herein, the undocumented structure extractor logic is configured to identify known, but undocumented, memory structures associated with software operating on a targeted computing device. For example, based on symbols received from OS vendors and/or data extrapolated from known layouts using heuristics, the undocumented structure extractor logic may gather intelligence that identifies the characteristics (e.g., type, function, etc.) of the OS component stored within an undocumented OS-based memory structure for a targeted computing device. Upon identification of the characteristics of the undocumented memory structure, further operations may be conducted to determine whether the undocumented memory structure maintains a particular OS component (e.g., page table, etc.) and the data structure elements associated with the OS component. The data structure elements may be utilized by the algorithm selector logic as described below.

The undocumented offset extractor logic is configured to identify undocumented and unknown memory structures associated with software installed on a targeted computing device. More specifically, the offset extractor logic may be configured to identify undocumented and unknown memory structures associated with software components (e.g., OS component(s)) by extracting content from memory locations based on experiential learning, heuristics, and signatures. For example, the content may be extracted through indirection (e.g., reliance on a stored address offset to a memory field with the stored content) and/or the content may be extracted based on "brute force" schemes or signature detection. The undocumented offset extractor logic provides further analytics on the undocumented memory structures associated with OS components, where the location of these memory structures is unknown (i.e., cannot be established using symbols and prior versions of the software for guidance).

The algorithm selector logic is configured to determine the operational flow of certain OS components to correlate the operational flows of OS components associated with targeted computing device undergoing a memory audit to known operational flows of the OS component within different known OS versions. Various algorithms are known for walking down the structures, where the algorithm selector logic chooses a known method depending on the layout of the structures to extract information.

As will be discussed below, the intelligence extraction system of the cyberthreat security system is to provide an automated, artificial intelligence (AI) based determination of memory structures of a targeted computing device to assist in memory forensics for cyberthreat determination of the targeted computing device and an enterprise over which the targeted computing device communicates.

I. Terminology

In the following description, certain terminology is used to describe features of the invention. For example, in certain situations, the terms "logic" and "component" are representative of hardware, firmware or software that is configured to perform one or more functions. As hardware, logic (or component) may include circuitry having data processing or storage functionality. Examples of such circuitry may include, but are not limited or restricted to, a hardware processor (e.g., microprocessor with one or more processor cores, a digital signal processor, a programmable gate array, a microcontroller, an application specific integrated circuit "ASIC," etc.), a semiconductor memory, or combinatorial elements.

Logic (or component) may be software in the form of a one or more software modules, such as executable code, an API, a subroutine, a function, a procedure, an applet, a servlet, a routine, source code, object code, a shared library/ dynamic load library, or even one or more instructions. These software modules may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to, a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "computing device" should be generally construed as physical (electronics) or virtualized device with data processing capability and/or a capability of connecting to any type of network, such as a public cloud network, a private cloud network, or any other network type. Examples of a computing device may include, but are not limited or restricted to, the following: a server, a mainframe, a router or other intermediary communication device, an endpoint (e.g., a laptop, a smartphone, a tablet, a desktop computer, a netbook, IoT device, industrial controller, etc.) or virtualized devices being software with the functionality of a physical computing device.

The term "symbol type" may be construed as a characteristic or a value identifying what kind of data the symbol can store, and the structure that the data will adhere to. For example, a Boolean type may retain two values (e.g., true or false) while a String type has an ability to maintain a sequence of characters.

The term "function signature" defines an input and/or output of functions, where each "function" is a plurality of instructions organized to perform a single, related action. The function signature may include, but is not limited or restricted to, parameters and their types as well as a return value and type.

The term "message" generally refers to as information placed in a prescribed format that is transmitted in accordance with a suitable delivery protocol or accessible through a logical memory structure such as an API or a web service or a portal. Illustrative examples of the delivery protocol may include, but are not limited or restricted to HTTP (Hypertext Transfer Protocol); HTTPS (HTTP Secure); Simple Mail Transfer Protocol (SMTP); File Transfer Protocol (FTP); iMESSAGE or iCLOUD Private Relay; Instant Message Access Protocol (IMAP); or the like. The message may be provided as one or more packets, frames, or any other series of bits having the prescribed, structured format.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a computing device or misappropriate, modify, or delete data. Malware may also correspond to an exploit, namely information (e.g., executable code, data, command(s), etc.) that attempts to take advantage of a vulnerability in software and/or an action by a person gaining unauthorized access to one or more areas of a computing device to cause the computing device to experience undesirable or anomalous behaviors. The undesirable or anomalous behaviors may include a communication-based anomaly or an execution-based anomaly, which, for example, could (1) alter the functionality of a computing device executing application software in an atypical manner (a file is opened by a first process where the file is configured to be opened by a second process and not the first process); (2) alter the functionality of the computing device executing that application software without any malicious intent; and/or (3) provide unwanted functionality which may be generally acceptable in another context. Additionally, malware may be code that initiates unwanted behavior which may be, as one example, uploading information, confidential or proprietary from an endpoint device to cloud storage without receiving permission from the user.

The term "interconnect" may be construed as a physical or logical communication path between two components. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism. Alternatively, the interconnect may include logical communications such as a function call or other redirection event to connect software components together.

In certain instances, the terms "compare," "comparing," "comparison," or other tenses thereof generally mean determining if a match (e.g., identical or a prescribed level of correlation) is achieved between information associated with two items under analysis. Also, the phrase "one or more" may be denoted by the symbol "(s)" such as "one or more elements" may be represented as "element(s)."

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

II. General Network Architecture

Referring to FIG. 1, a block diagram illustrating an exemplary embodiment of a networking environment 100 is shown. The networking environment 100 features an analytical service 110, such as a security operation center (hereinafter, "SOC") for example, which is communicatively coupled to a plurality of computing devices 120 (e.g., "N" endpoints $120_1$-$120_N$, where N>1). The networking environment 100 may be deployed as part of a public network and/or a private network (e.g., an organization or enterprise network).

For example, when deployed as part of a public network, the networking environment 100 may represent a portion of the Internet and encompass cloud services/resources 130 that are in communication with an intelligence extraction system 140 deployed within the analytical service 110. According to one embodiment of the disclosure, the cloud services/resources 130 may include a symbol data store 132 (e.g., a third-party public symbol server) from which one or more symbol files 135 (hereinafter, "symbol file 135") may be retrieved. Herein, the symbol file 135 is configured to assist in the diagnostics of an application and/or a process running on one of the computing devices 120. Herein, the symbol file 135 may include, but is not limited or restricted to the following: (1) type information for variables and/or structures, (2) source file paths, (3) function signatures and their entry points addresses, or the like. The symbol file 135 may contain several hundred symbols 137.

Each computing device $120_1$-$120_N$ (e.g., computing device $120_1$) includes a network interface 150, a processor (P) 152 and a non-transitory storage medium (NTSM) 154, which is communicatively coupled to the processor 152. The non-transitory storage medium 154 is configured to store an operating system (OS) 156 that manages operability of logic within the computing device $120_1$ along with a cyberthreat detection system (CDS) 160. The cyberthreat detection system 160 may be deployed as one or more software modules 165 installed on the computing device $120_1$, where the software modules 165 may operate as artificial intelligence based (AI-based) logic that conducts analytics of internal memory (hereinafter, "memory forensics") in accordance with rules and/or models accessible to the AI-based logic 165.

Additionally, the AI-based logic 165 may be configured to respond to query messages 170 from the intelligence extraction system 140, where the query messages 170 are intended to gather information 175 for use in identifying memory structures associated with software installed within the targeted computing device $120_1$ (hereinafter, "memory structure data"). As an illustrative example, the query messages 170 are intended to gather memory structure data 175 associated with undocumented and/or unknown OS-based memory structures, where access to the content of these memory structures is useful for cyberthreat detection and prevention.

According to one embodiment of the disclosure, the memory structure data 175 may include (1) OS properties 176 (e.g., OS type, version, etc.) and/or (2) OS artifacts 177 extracted through query/response messages 170/175 exchanged between the intelligence extraction system 140 and the targeted computing device (e.g., endpoint $120_1$) via the network interface 150. Herein, the OS artifacts 177 may be extracted by one or more query messages 170 based on known symbols utilized by the OS vendor. The OS artifacts 177 constitute data that can be subsequently verified whether an investigated memory structure is associated with a certain functional component (e.g., timestamp, etc.) or not. This verification may be conducted by at least comparing the OS artifacts 177 associated with the investigated memory structure (obtained from the query messages 170) to known artifacts extracted from one or more known OS-defined APIs. Additionally, the memory structure data 175 may further include offsets 178, which may be used by the intelligence extraction system 140 to uncover unknown memory structures recognized from experiential learning, heuristics, and signatures (e.g., offsets relied upon by prior OS internal structures) as well as undocumented memory structures as determined above.

Once a substantial composition of the memory structures associated with the targeted OS have been identified, the algorithm selector logic is configured to access the content and determine relevant artifacts to understand the behavior (operational flows) of certain memory structures that are dynamic and more prone to a cyberattack. These memory structures may include, but are not limited or restricted to page table selector, page tables, virtual address descriptors (VADs), or the like.

As should be understood, the illustrative representation of the intelligence extraction system 140 and/or the computing devices $120_1$-$120_N$ may include one or more hardware processors, a memory (e.g., non-transitory, computer-readable medium), and/or one or more network interfaces (referred to as "network interface(s)"). These components may be at least partially encased in a housing of the computing device, which is made entirely or partially of a rigid material (e.g., hardened plastic, metal, etc.) that protects these components from atmospheric conditions. Alternatively, the intelligence extraction system 140 and/or one or more of the computing devices $120_1$-$120_N$ may include logical components based on software such as virtual processor(s) or the like.

III. Memory Forensic Content Generator

Figure 2:
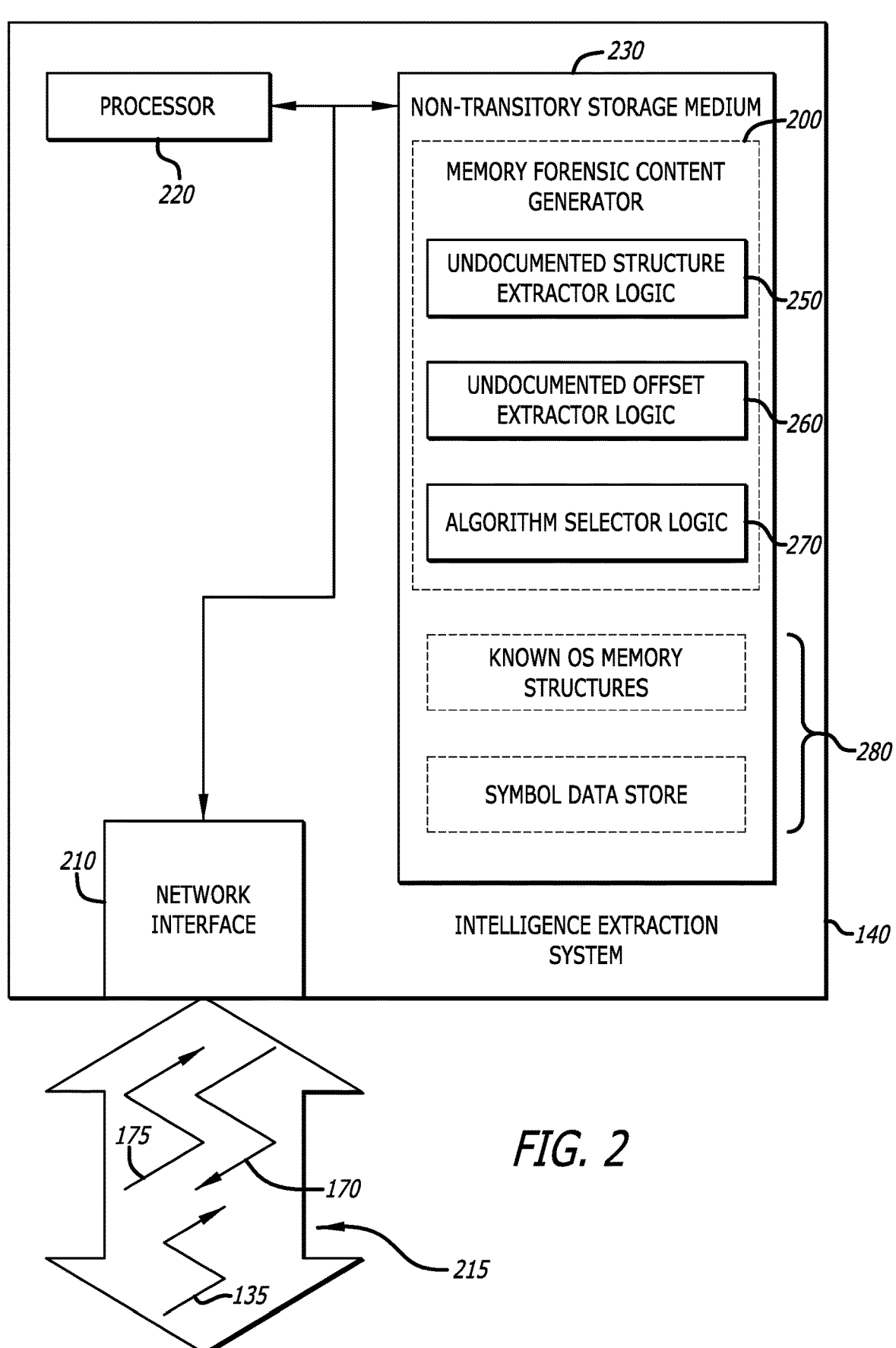
FIG. 2 is a block diagram illustrating an exemplary embodiment of a memory forensic content generator deployed within the intelligence extraction system of FIG. 1 and communicatively coupled to an on-premises detection system.

Referring now to FIG. 2, a block diagram illustrating an exemplary embodiment of a memory forensic content generator 200 deployed within the intelligence extraction system 140 of FIG. 1 is shown. The intelligence extraction system 140 includes a network interface 210, one or more processors 220, and a non-transitory storage medium 230. Herein, the network interface 210 enables the intelligence extraction system 140 to communicate with the computing devices $120_1$-$120_N$ of FIG. 1 over an interconnect 215 for gathering the memory structure data 175 therefrom.

The non-transitory storage medium 230 includes the memory forensic content generator 200, which is responsible for automatically conducting a memory audit of physical memory associated with a targeted computing device (e.g., computing device $120_1$ of FIG. 1) by at least identifying undocumented (but known or anticipated) memory structures through (i) symbol extraction and analysis and/or (ii) extrapolation from prior memory architectures. As shown, the memory forensic content generator 200 includes an undocumented structure extractor logic 250, an undocumented offset extractor logic 260, and an algorithm selector logic 270. In addition, the non-transitory storage medium 230 further includes one or more local data stores 280 which provide optional internal storage (e.g., cached storage of symbols, known memory structures already examined, etc.).

Herein, according to one embodiment of the disclosure, the undocumented structure extractor logic 250 includes logic that is configured to identify memory structures associated with known (or strongly anticipated) software components, where the location of the software components is undocumented. As an illustrative example, certain OS components may include, but are not limited or restricted to a memory structure that retains (i) "type" information (e.g., shape of the memory structure) and/or (ii) "function" information. Stated differently, the undocumented structure extractor logic 250 may be configured to identify memory structures associated with OS components that are known to exist in the computer device's OS, but there is no documentation identifying the location for the OS components.

Herein, according to one embodiment of the disclosure, the undocumented structure extractor logic 250 detects the undocumented memory structures by initially identifying an OS version running on a targeted computing device (e.g., the first computing device $120_1$). Using the identified OS version, the undocumented structure extractor logic 250 is configured to extract the symbol file 135 (inclusive of symbols) from the symbol data store 130 external to the intelligence extraction system 140 of FIG. 1. Additionally, or in the alternative, the undocumented structure extractor logic 250 may be configured to extract the symbol file (or a subset of symbols) maintained in the internal data store 282.

Besides leveraging the symbol file 135 in order to uncover the undocumented memory structures associated with one or more software components (e.g., OS components), the undocumented structure extractor logic 250 is further configured to extrapolate, based on various OS versions, a predicted layout of the OS memory structure. This extrapolation may include a comparison of certain undocumented OS components to contents maintained in memory locations designated for corresponding OS components for one or more previous OS versions to determine whether the undocumented OS components reside at the same or different memory structures.

In summary, through the use of symbol information or extrapolation, verification of a location of an undocumented memory structure with a targeted OS component may be accomplished by matching the values contained in the memory structure(s), which are located based on the symbol information and/or extrapolation, to artifacts extracted from known OS defined APIs to confirm whether the OS components are stored in those locations.

Referring still to FIG. 2, the undocumented offset extractor logic 260 is configured to assist in identifying undocumented memory structures that have not been successfully determined by the undocumented structure extractor logic 250. More specifically, the undocumented offset extractor logic 260 is configured to gather information associated with memory structures at one or more addressing offsets from prior memory locations where the content associated with the undocumented software components have resided or was accessible indirectly in prior software versions (e.g., prior OS versions).

For example, the undocumented offset extractor logic 260 may be configured to ascertain whether certain fields in the memory structure contain relevant indirection (e.g., jump instructions, address pointers, etc.), which provides access to a memory structure used by a "targeted" OS component being sought within the targeted computing device $120_1$, such as a timestamp associated with the OS memory structure. After identification of the targeted OS component, the undocumented offset extractor logic 260 may utilize offsets, guided by previous OS memory structures, to ascertain a presence of other undocumented and unknown OS components to continue gathering intelligence associated with the OS memory structure under analysis.

The algorithm selector logic 270 is responsible for accessing memory structures to uncover relevant artifacts for software such as certain OS components such as a virtual address descriptor (VAD), page tables, or the like. For example, the algorithm selector logic 270 may be configured to identify operability of the OS components and to select an algorithm performed by a known OS components with similar operability. For example, the algorithm selector logic 270 may emulate operability of the OS component and select a known algorithm with operations that resemble (e.g., substantially correlated) to the OS component operability. Examples of known algorithms may include "depth-track-and-lose-left," which is an algorithm that identifies certain paths of analysis cascade via a left-most tree branch.

Figure 3:
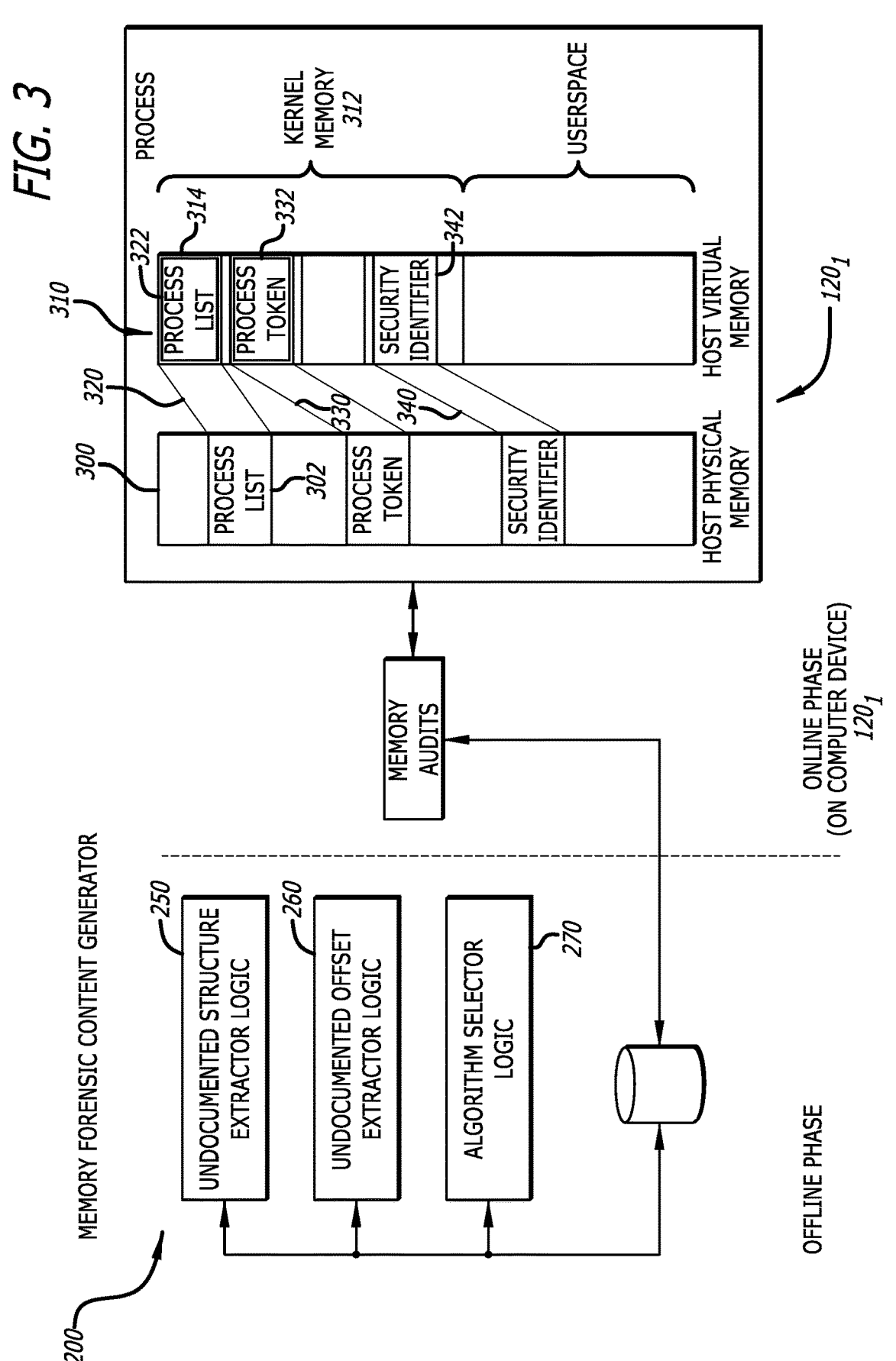
FIG. 3 is a block diagram illustrating an exemplary embodiment of the memory forensic content generator of FIG. 1 conducting a memory audit on a targeted computing device.

Referring to FIG. 3, a block diagram illustrating an exemplary embodiment of the memory forensic content generator of FIG. 1 conducting a memory audit on a targeted computing device (e.g., computing device $120_1$) is shown. Herein, stored within non-transitory storage medium 230 of FIG. 2, the memory forensic content generator 200 is configured to conduct memory audits by (i) identifying a version of an operating system (OS) deployed within the computing device $120_1$, (ii) scanning a host physical memory 300 of the computing device $120_1$ based on queries generated by the memory forensic content generator 200, and (iii) uploading scripts (and script updates) to the computing device $120_1$. Although not described in detail herein, the scripts facilitate an exchange of content between the memory forensic content generator 200 and contents of the OS, which are stored within kernel memory 312 that is a portion of a virtual memory 310 of the computing device $120_1$.

As an illustrative example, where the memory forensic content generator 200 is attempting to gather intelligence as to memory structures associated with a particular process, the memory forensic content generator 200 may include a first query 320 to locate a process list 322, namely an aggregate of names of active processes (e.g., running processes) on the computing device $120_1$. Where a first field 302 of the host physical memory 300 includes information that provides access to the process list 322 stored within a field 314 of the kernel memory 312 (e.g., an address pointer to the field 314), a memory management unit (MMU) performs the translation between virtual/physical addresses, enabling the memory forensic content generator 200 to gain access to the process list 322 stored within the host virtual memory 310 via the physical memory 300. Similarly, the memory forensic content generator 200 may include a second query 330 to locate a process token 332 within the kernel memory 312, namely an object that describes the security context of the process and/or a third query 340 to locate a security identifier 342 within the kernel memory 312, The security identifier 342 may constitute a value used to identify the user, group and accounts associated with the active processes on the computing device $120_1$.

For this embodiment of the disclosure, the memory forensic content generator 200 gathers intelligence surrounding the memory structures associated with the OS through scans of the physical memory 300 for the "targeted" computing device $120_1$.

A. Undocumented Structure Extractor Logic

Figure 4:
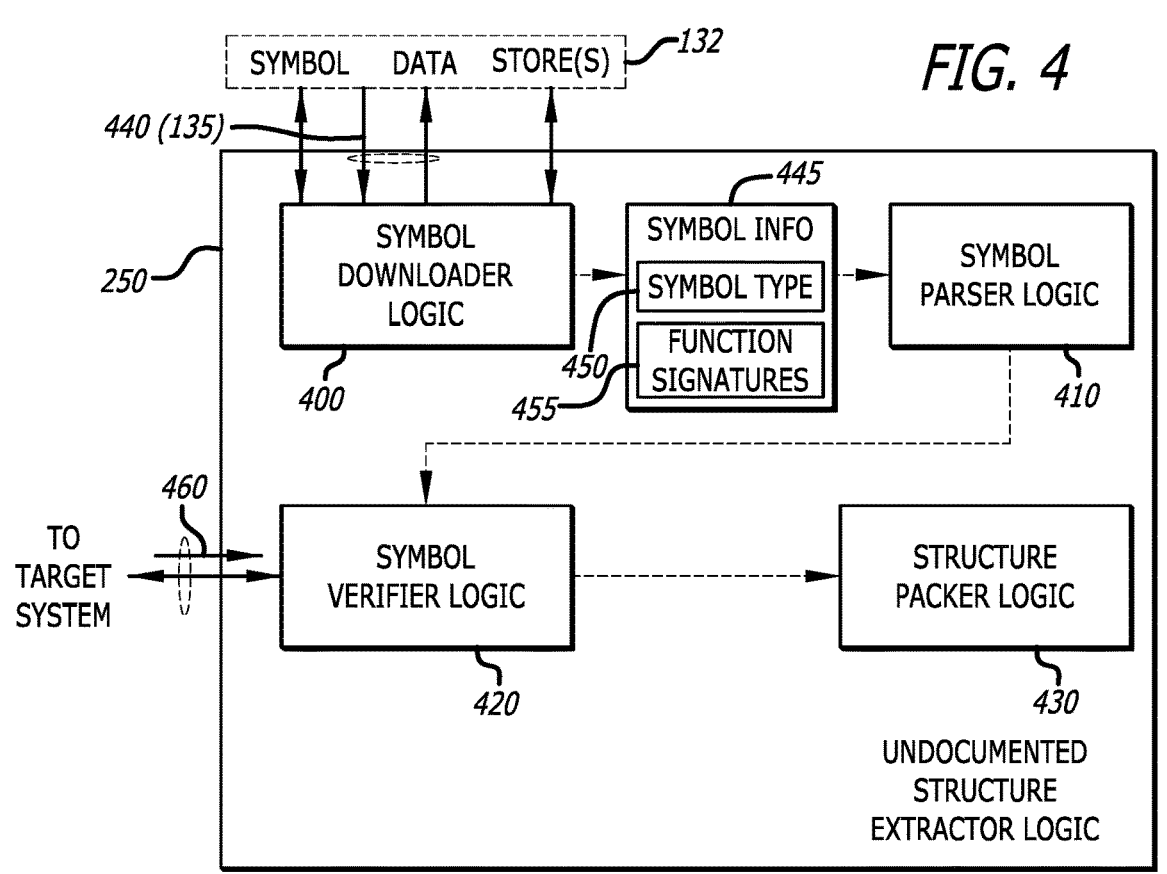
FIG. 4 is a block diagram illustrating an exemplary embodiment of an undocumented structure extractor logic deployed within the memory forensic content generator of FIG. 2.

Referring now to FIG. 4, a block diagram illustrating an exemplary embodiment of the undocumented structure extractor logic 250 deployed within the memory forensic content generator 200 of FIG. 2 is shown. Herein, the undocumented structure extractor logic 250 includes symbol downloader logic 400, symbol parser logic 410, symbol verifier logic 420, and structure packer logic 430. Collectively, these logic components 400/410/420/430 are configured to identify and verify memory structures associated with software components that are known (or anticipated with a high degree of certainty) to be part of software installed on a targeted computing device (e.g., first computing device $120_1$), but the location of the software components is undocumented. To accomplish this identification, and subsequent verification, the undocumented structure extractor logic 250 is communicatively coupled to (1) one or more symbol data store(s) 137 (e.g., external symbol data store(s) 130 and/or internal symbol data store(s) 280) and (2) the computing devices $120_1$-$120_N$ of FIGS. 1-2.

According to one embodiment of the disclosure, the symbol downloader logic 400 is configured to gather symbols that are associated with the version of the targeted logic for analysis. As an illustrative example, the symbol downloader logic 400 may be configured to determine the version of an operating system (OS) installed on the targeted computing device (e.g., computing device $120_1$). The OS version may include, but is not limited or restricted to information that identifies the OS, such as the OS edition along with its version (e.g., Windows® 10 Enterprise, version 22H2) for example. For clarity's sake, the operability of the undocumented structure extractor logic 250 will be described in conducting an OS memory audit, although memory audits of other software may be performed in a similar manner.

Upon obtaining the OS version, the symbol downloader logic 400 is configured to select a symbol data store from which one or more symbol files 440 (hereinafter, "symbol file 440"), associated with the OS version, may be obtained. Where the symbol downloader logic 400 is installed within an intelligence extraction system 140 deployed within a SOC 110 (see FIG. 1), the symbol file 440 may be acquired from the external symbol data store 132 (e.g., Microsoft symbol server). Alternatively, the symbol file 440 may be acquired from the internal data store 280 within the intelligence extraction system 140 (see FIG. 2). Examples of the symbol file 440 may include a dynamic link library, such as "ntdll.dll".

After selection of the symbol data store, such as the external symbol data store 130 of FIG. 1 for example, the symbol downloader logic 400 is further configured to establish communications with the external symbol data store 130 via the network interface 210 of FIG. 2. After communications are established with the external symbol data store 130, the symbol downloader logic 400 downloads the symbol file 440 associated with the acquired version of the software OS version, which is also represented as symbol file 135 of FIG. 1. Herein, the symbol file 440 provides intelligence (information) for understanding the software components associated with the OS of the targeted computing device (hereinafter, the "OS components"), where this intelligence is useful for cyberthreat investigation and/or remediation. The symbol file 440 does not include source code. Rather, the symbol file 440 may include, but is not limited or restricted to, different symbol types such as names/addresses of global variables, names/locations of local variables, function names and their entry addresses, or the like. The entry addresses may operate as software pointers directed to certain storage locations utilized by the OS of the targeted computing device.

Operating in cooperation with the symbol downloader logic 400, the symbol parser logic 410 is configured to parse information associated with each of the symbols included within the retrieved symbol file 440. From this symbol information 445, the symbol parser logic 410 is configured to generate a general mapping of the memory structures for certain OS components for further analysis and verification. For instance, the symbol parser logic 410 may be configured to extract the symbol information 445, such as symbol type information 450 and/or function signatures and/or addresses associated with the symbols (hereinafter, "function signatures 455"), included in the symbol file 440.

Herein, according to one embodiment of the disclosure, the symbol type information may be used to determine a layout of a memory structure for the symbol as well as the potential layout of a memory structure of the OS component corresponding to the symbol. The function signatures 455 may be used to identify parameters and/or addresses of the memory structure for the symbol. The extracted symbol information 445 is relied upon to confirm the presence and memory location for certain OS components based on scans for content within the OS that is correlated to content within memory associated with the retrieved symbols. The OS components may be selected as the components that are more susceptible to a cyberattack and the location of these OS components in order to conduct an audit (analysis) on their memory locations.

Stated differently, the symbol parser logic 410 is further configured to determine a memory structure associated with a symbol that corresponds to a targeted OS component, which is utilized to identify a presence and memory location for that targeted OS component. For example, the symbol file 440 may identify a particular symbol directed to the name and type (layout) of a process, such as the process "Foo" having a memory structure of four (4) parameters each with word-size lengths. From this, symbol parser logic 410 would provide this information to the symbol verifier logic 420 for location of the process "Foo" and its parameters for used by the symbol verifier logic 420 in comparison with memory structures within the actual OS.

The symbol verifier logic 420 is configured to verify whether artifacts 460 associated with targeted OS components, which are extracted from known OS structures obtained via one or more known OS-defined APIs, are consistent with the content included in the memory structures associated with the symbols (pertaining to OS components) provided by the symbol parser 410. As described below, the artifacts are extracted by a structure extractor installed on the targeted computing device, which is configured to extract artifacts from memory structures within virtual memory of the targeted computing device. These artifacts associated with the OS component are compared to content associated with the symbols corresponding to the targeted OS content.

This comparison is conduced to (i) determine that the OS component exists within the OS and the OS component has not been subject to a cyberattack by manipulation of content therein. If the correlation between the artifacts and the content satisfies a prescribed threshold (i.e., a match), the memory audit has been successful and the symbol type information is provided to the structure packer logic 430. If the correlation between the artifacts and the content fails to satisfy the set threshold, the symbol information is provided to the undocumented structure extractor 260 of FIG. 2.

The structure packer logic 430 is configured to convert the symbol type information into an agnostic format and collect meta data associated with the symbol types analyzed by the symbol verifier 420. The metadata further includes metadata pertaining to the OS such as backlinks or the like.

Figure 5:
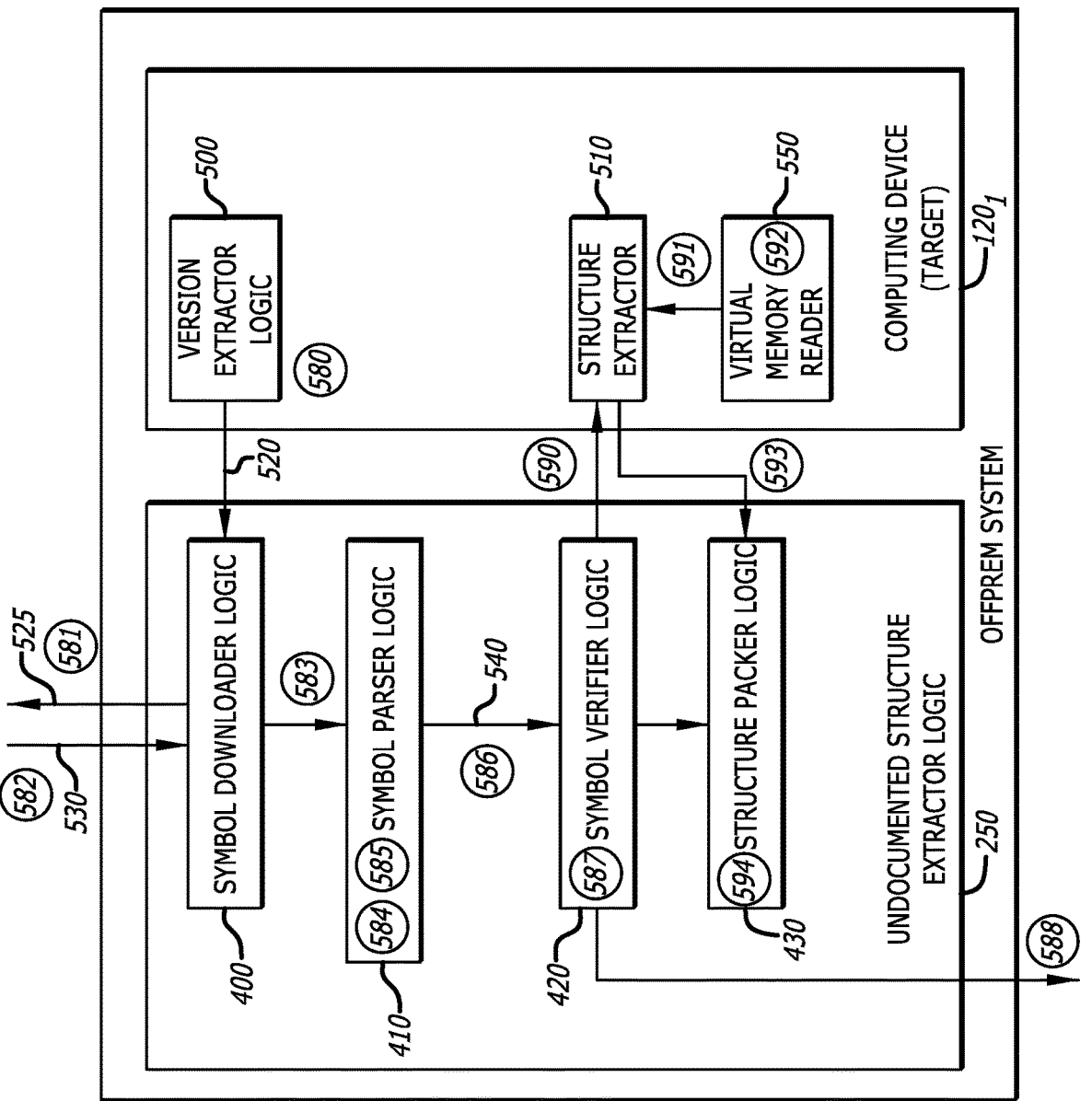
FIG. 5 is a flowchart illustrating the operations conducted by the undocumented structure extractor logic of FIG. 4.

Referring now to FIG. 5, a flow chart illustrating operations of the undocumented structure extractor logic 250 of FIG. 4 is shown. Herein, the undocumented structure extractor logic 250, operating as part of the intelligence extraction system 140 of FIG. 1, includes the symbol downloader logic 400, the symbol parser logic 410, the symbol verifier logic 420, and the structure packer logic 430. The undocumented structure extractor logic 250 is communicatively coupled to one or more computing devices (e.g., targeted computing device 120₁). The targeted computing device 120₁ includes logic that is installed to operate with the undocumented structure extractor logic 250, namely version extractor logic 500 and a structure extractor logic 510.

Herein, the symbol downloader logic 400 is configured to detect the version of the OS (OS version 520) associated with the targeted computing device 120₁ (See operation 580). More specifically, the version extractor logic 500 is configured to extract the OS version 520 from system information maintained within data stores of the targeted computing device 120₁ and provide the OS version 520 to the symbol downloader logic 400. According to one embodiment of the disclosure, prior to extraction of the OS version 520 by the version extractor logic 500, the symbol downloader logic 400 may initiate communications with the targeted computing device 120₁ through a credential exchange (e.g., username/password login), and after credential verification, initiate a query message (not shown) to obtain the OS version 520 (i.e., a "pull" data acquisition). Alternatively, the extraction of the OS version 520 may be conducted without the query message (i.e., a "push" data acquisition).

After receiving the OS version 520, the symbol downloader logic 400 is configured to select a symbol data store to retrieve symbol information 530 associated with the OS and establish communications with the symbol data store (See operations 581, 582). Thereafter, the symbol downloader logic 400 generates a symbol query message 525 to obtain the symbol information 530 (e.g., symbol file) pertaining to the OS version 520. The symbol information 530 includes a plurality of symbols, where each symbol may include a timestamp, symbol type information, function signatures, or the like. The symbol downloader logic 400 may be configured to provide at least a portion of the symbol information 530 to the system parser logic 410, which is configured to parse (segment) the symbol information 530 to recover content associated with each of the plurality of symbols (See operations 583, 584).

Herein, the symbol parser logic 410 is configured to locate and identify symbols, representing different OS components, within the symbol information 530. For example, for each symbol, the symbol parser logic 410 may be configured to extract the timestamp for verification as well as symbol type information and function signatures with corresponding addresses (See operation 585). The portion of the content 540 associated with the symbol information 530 (hereinafter, "symbol content") may include data associated with each symbol (e.g., name, its type, functions/parameters, etc.), where the layout of each symbol may be determined by extrapolating the symbol layouts based on prior OS versions.

Thereafter, the symbol content 540 is provided to the symbol verifier logic 420 (See operation 586), which is configured to verify an accuracy of the memory structure extraction utilizing the symbol information 530 in locating undocumented OS components corresponding to the symbols. More specifically, from the symbol content 540, the symbol verifier logic 420 has knowledge of names of OS components (e.g., processes, etc.), where the symbol verifier logic 420 is adapted to retrieve content associated with the undocumented OS components of the targeted computing device 120₁ through well-known APIs (See operation 587). Where the symbol verifier logic 420 is unable to locate any of the undocumented OS components with the OS, the symbol content 540 associated with that undocumented OS component may be provided to the undocumented offset extractor logic 260 (See operation 588) as described below.

More specifically, as shown in FIG. 5, the symbol verifier logic 420 provides the symbol content 540 to the structure extractor logic 510 of the targeted computing device 120₁ (See operation 590). The structure extractor logic 510 is configured to obtain content associated with the memory structures for the OS components corresponding to the symbols pertaining to the OS. This may be accomplished by the structure extractor logic 510 reading memory that pertains to one or more OS components that correspond to each symbol included within the symbol content 530 (See operation 591). The content associated with the memory structures for the OS components may be extracted by virtual memory reader logic 550, which extracts the contents of the memory structures associated with the one or more OS components from virtual memory of the targeted computing device 120₁ (See operation 592).

As shown in FIG. 5, the structure extractor logic 510 provides the content included in the detected OS components, which is consistent with the symbol content corresponding to the OS component, to the structure packer logic 430 (See operation 593). Thereafter, the structure packer logic 430 converts content associated with the different OS component types into an agnostic format and further includes metadata associated with each OS component type (See operations 594). The metadata provides context of the OS component. The structure packer logic 430 is further configured to include metadata associated with the OS such as OS version, kernel version, or the like.

B. Undocumented Offset Extractor Logic

Figure 6:
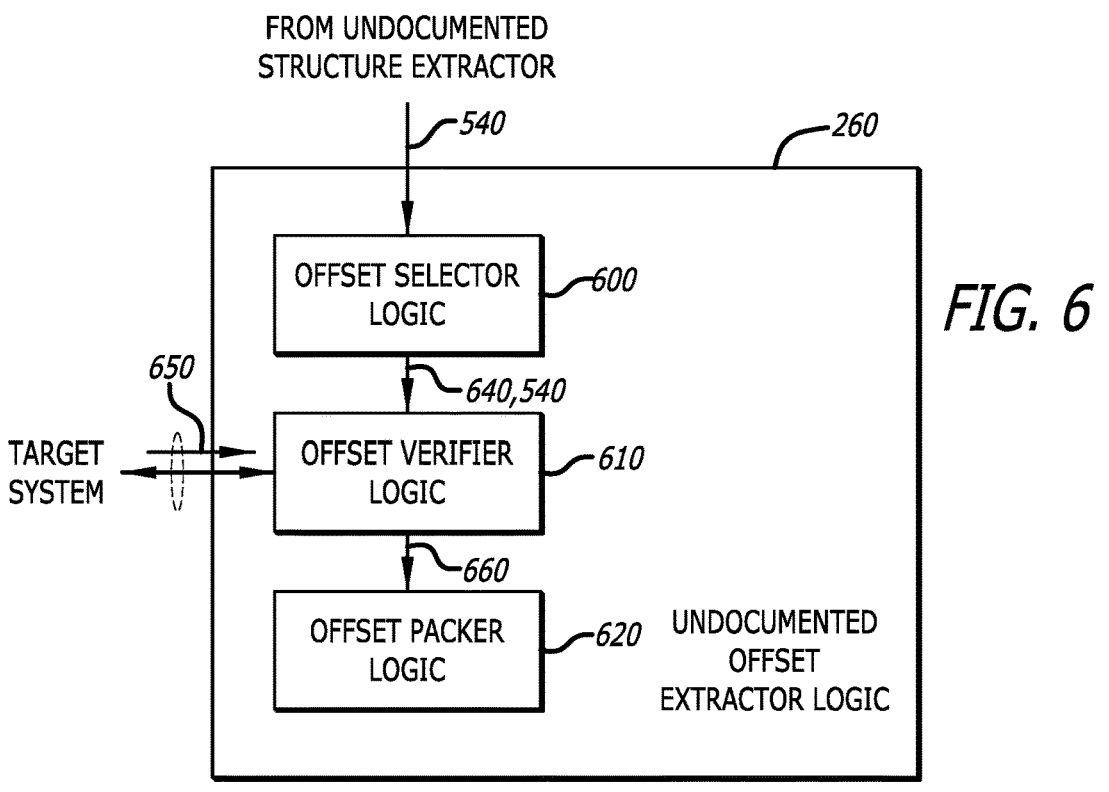
FIG. 6 a block diagram illustrating an exemplary embodiment of an undocumented offset extractor logic deployed within the memory forensic content generator of FIG. 2.

Referring to FIG. 6, a block diagram illustrating an exemplary embodiment of the undocumented offset extractor logic 260 deployed within the memory forensic content generator 200 of FIG. 2 is shown. Herein, the undocumented offset extractor logic 260 includes offset selector logic 600, offset verifier logic 610, and offset packer logic 620. Collectively, these logic components 600/610/620 are configured to locate undocumented memory structures associated with particular OS components that were unable to be located by the undocumented structure extractor logic 250 (i.e., unknown, undocumented OS components). Additionally, the undocumented offset extractor logic 260 are considered to identify offsets associated with certain parameters within the unknown, undocumented memory structure uncovered by the logic 260.

In order to locate the unknown, undocumented memory structures associated with targeted OS components, the undocumented offset extractor logic 260 is configured to receive information directed to the size of a memory structure that is associated with (or includes) the targeted OS component. The memory structure size may be obtained from the symbol type information, which is provided as part of the symbol content 540 to the undocumented offset extractor logic 260 from the undocumented structure extractor logic 250. The offset selector logic 600 may conduct analytics on content within the memory structure at different addressing offsets based on analytics automatically conducted by offset extrapolator logic 700 or analytics manually conducted by intervention filter logic 710 as illustrated in FIG. 7 and described below.

Upon detecting a selected offset 640 within the unknown, undocumented memory structure associated with the targeted OS component, the offset selector logic 600 provides the offset 640 and the symbol content 540 (i.e., at least a portion of the symbol content 540) to the offset verifier logic 610, which receives the content 650 from memory associated with the OS operating on the targeted computing device 120₁ at the offset address. The offset verifier logic 610, upon detecting that the contents 650 at the offset addresses within the memory structures match the symbol content 540, provides both at least a portion of encode data 660, namely at least the symbol content 540 and address offset 640, to the offset packer logic 620 to encode. The offset selector logic 610 may be further configured identify offsets associated with parameters (and the parameters themselves) included in the unknown, undocumented memory structure uncovered by the offset selector logic 610. It is contemplated that the type of parameters may be identified by a recursive operation by the undocumented memory extraction logic 250 based on the memory structure for the OS component being determined by the undocumented offset extractor logic 260.

Figure 7:
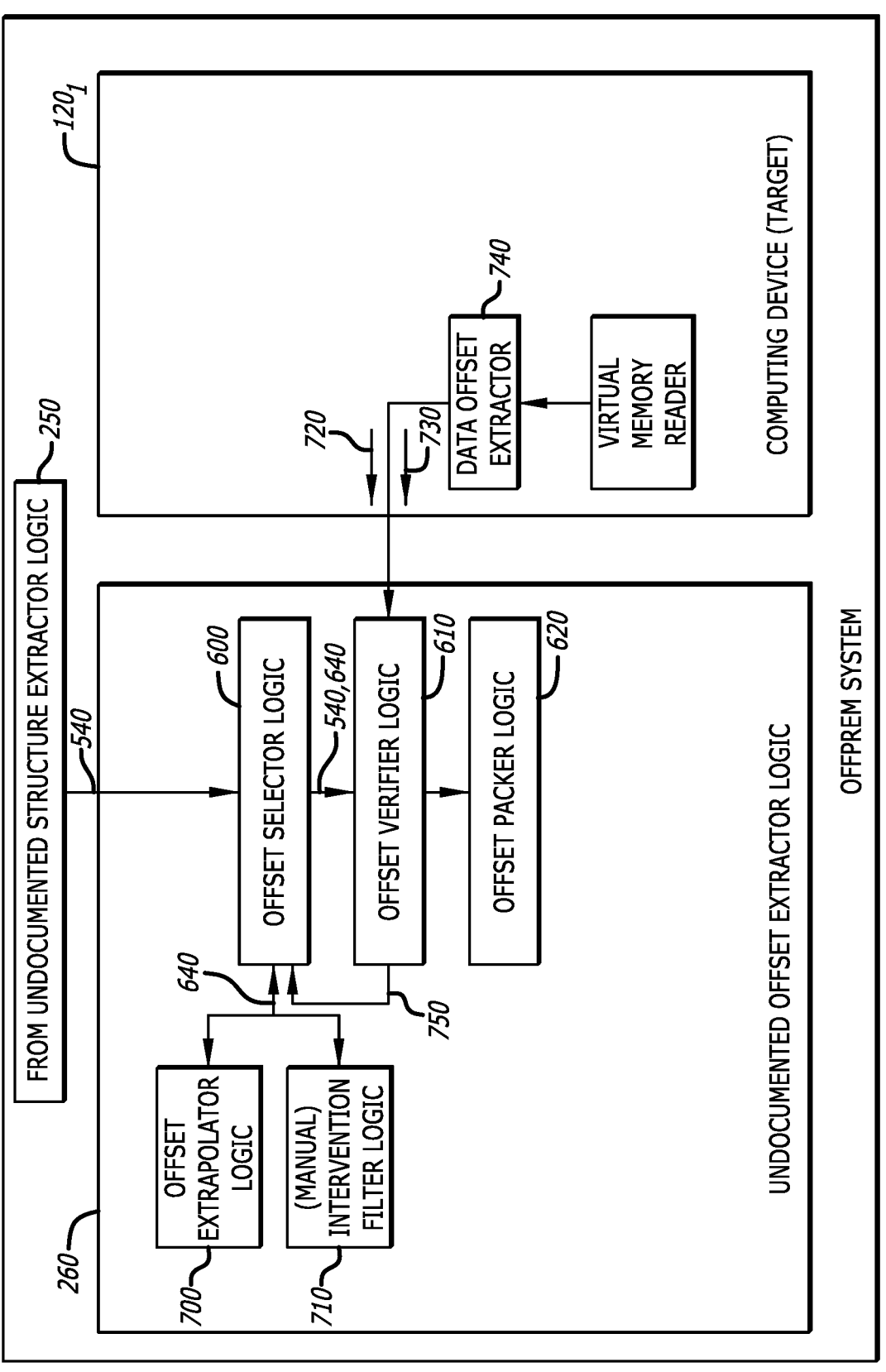
FIG. 7 is a flowchart illustrating the operations conducted by the undocumented offset extractor logic of FIG. 6.

Referring now to FIG. 7, a flow chart illustrating operations of the undocumented offset extractor logic 260 of FIG. 6 is shown. Herein, the undocumented offset extractor logic 260, operating as part of the intelligence extraction system 140 of FIG. 1, includes the offset selector logic 600, the offset verifier logic 610, and the offset packer logic 620. The undocumented offset extractor logic 260 is configured to select offsets within memory structures to hunt for particular OS components that remain unlocated after operations by the undocumented structure extractor logic 250 of FIGS. 4-5.

Herein, the offset selector logic 600 is configured to receive the symbol content 540 associated with an OS component that has not been located by the undocumented structure extractor logic 250. The symbol content 540 may include the name or names of OS components (e.g., processes, etc.) under analysis, where the offset selector logic 600 is configured to determine an offset based on operations conducted by the offset extrapolator logic 700 and/or the intervention filter logic 710.

The offset extrapolator logic 700 is configured to automatically select an addressing offset to commence a determination as to whether a targeted OS component resides within a memory field accessible at the addressing offset. This selection process may be based on heuristics, such as offsets experienced by other OS components under analysis, prior OS versions, or the like. In contrast, the intervention filter logic 710 allows for manual insertion of an address offset for situations where the offset extrapolator logic 700 has been incapable of locating an undocumented and unknown memory structure associated with a targeted OS component.

The offset selector logic 600 is configured to provide the offset 640 and the symbol content 540 to the offset verifier logic 610, which receives an offset 720 from data offset extractor logic 740 associated with the OS operating on the targeted computing device 120₁ along with data 730 associated with the offset 720. The offset verifier logic 610, upon detecting that the content data 730 at the offset 720 within the OS of the targeted computing device 120₁ matches the symbol content 540, provides both at least a portion of the encode data 660, namely at least the symbol content 540 and address offset 640, to the offset packer logic 620 for encoding. Otherwise, the offset verifier logic 610 returns signaling to identify that the offset 640 is not directed to the targeted OS component and requests another offset to investigate via feedback communications 750.

C. Algorithm Selector Logic

Figure 8:
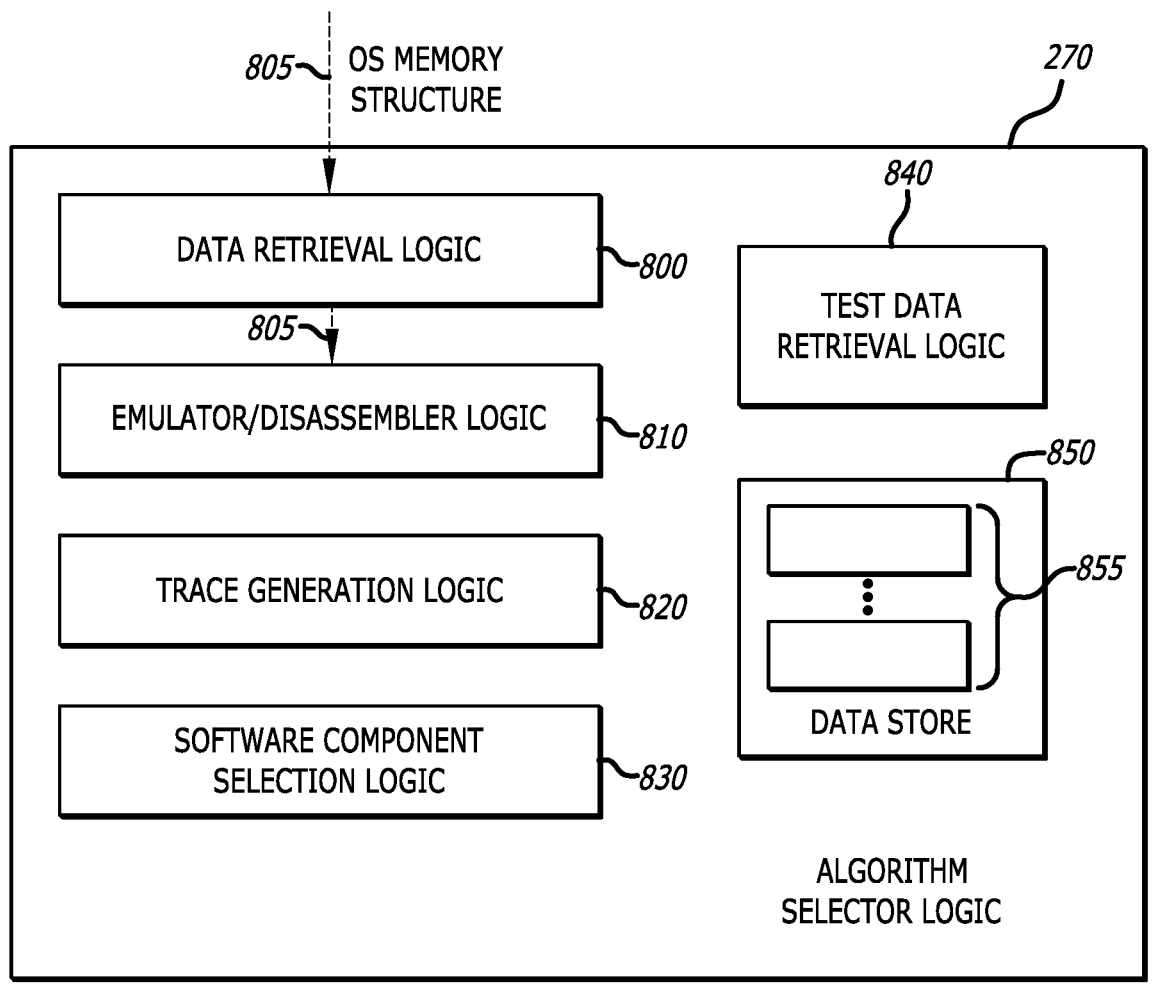
FIG. 8 is a block diagram illustrating an exemplary embodiment of algorithm selector logic deployed within the memory forensic content generator of FIG. 2.

Referring now to FIG. 8, a block diagram illustrating an exemplary embodiment of the algorithm selector logic 270 deployed within the memory forensic content generator 200 of FIG. 2 is shown. The algorithm selector logic 270 includes data retrieval logic 800, processor emulator/disassembler logic 810, trace generation logic 820, software component selection logic 830, test data retrieval logic 840, and/or algorithm data store 850. These logic components conduct analytics to determine the execution flow for the undocumented memory structures associated with certain OS components that may be used to confirm that the operations of these OS components have not been altered through a cyberattack as described below.

The data retrieval logic 800 is configured to retrieve memory structures 805 for the uncovered OS components (hereinafter, "OS memory structures" 805), which are loaded into the emulator/disassembler logic 810. The OS memory structures 805 provided to the emulator/disassembler logic 810 may be a subset of the memory structures for OS components detected by the undocumented structure extractor logic 250 and the undocumented offset extractor logic 260. As a result, the emulator/disassembler logic 810 conducts emulation operations on OS components, where the trace generation logic 820 inserts one or more intercept points at memory address offset locations that correspond to certain parameters within a targeted OS memory structure. Hence, when a process relying on the OS component accesses a parameter within the memory structure for that OS component, from the offsets, the algorithm selector logic 270 can generate a trace that identifies the parameters accessed and the order of such access.

Based on the generated trace, the software component selection logic 830 compares the execution flow associated with the generated trace with "known" execution flows exhibited by algorithms 855 within the algorithm data store 850. These "known" execution flows may be associated with different OS versions (e.g., Windows® XP, Windows® 7, Windows® 10, etc.). Where the correlation between the execution flow and the known execution flows exceeds a prescribed level of correlation (e.g., exact match, flow matches except for one operation, etc.), the software component selection logic 830 identifies this OS component corresponds to the OS component that performs the known execution flow. If no correlation, this determination signifies that the OS component may be compromised or further analytics are required for the OS of the targeted computing device (and the OS component in particular). Successive determinations of the execution flows of the uncovered memory structures enables the intelligence extraction system 140 to formulate a collection of actual OS components utilized by the OS of the targeted computing device, which may be relied upon for subsequent memory audits.

Figure 9:
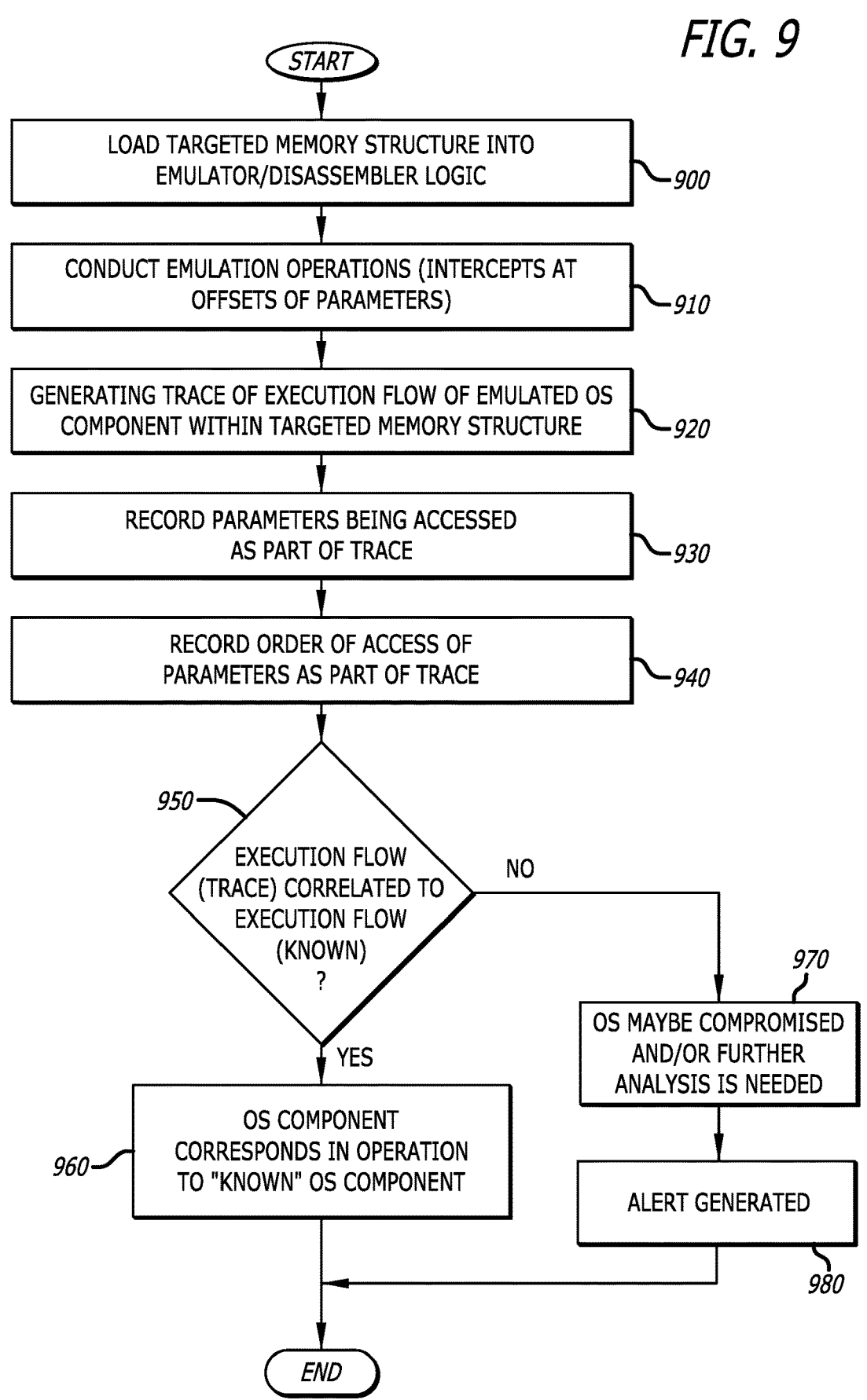
FIG. 9 is a flowchart illustrating the operations conducted by the algorithm selector logic of FIG. 8.

Referring to FIG. 9, a flowchart illustrating the operations conducted by the algorithm selector logic 270 of FIG. 8 is shown. Herein, a targeted memory structure (e.g., OS memory structure) is loaded into the emulator/disassembler logic 810 of FIG. 8 (operation 900). Thereafter, emulation operations are conducted on the OS component associated with the targeted memory structure, where one or more intercept points are inserted at offsets from a prescribed address of the targeted memory structure (operation 910). According to one embodiment, each intercept point may correspond to a parameter within the targeted memory structure. During the emulation operations, a trace is generated in response to one or more processes accessing the OS component (operation 920), where the parameter(s) being accessed and the order of access may be recorded as part of the trace (operations 930 and 940).

Based on the generated trace, a comparison is conducted between (i) the execution flow associated with the generated trace and (ii) "known" execution flows, namely execution flows exhibited by known (or previously evaluated) OS components (operation 950). As an illustrative example, these "known" execution flows may be associated with OS components pertaining to legacy OS versions that have been evaluated (e.g., Windows® XP, Windows® 7, Windows® 10, etc.). Where the correlation between the execution flow and the known execution flows exceeds a prescribed level of correlation (e.g., exact match, match except for one operation within the operation flow, etc.), the OS component is determined to correspond to the known OS component that performs a substantially similar execution flow (operations 950, 960). If there is no correlation, this determination signifies either (i) the OS component may be compromised and/or (ii) further analytics are required for the OS component and an alert may be issued to a cybersecurity analyst to get involved in the analysis (operations 950, 970, 980). Successive determinations of the execution flows of the uncovered memory structures enables the intelligence extraction system 140 of FIG. 1 to identify the operational flow of the actual OS components utilized by the OS of the targeted computing device.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An algorithm selector logic circuitry for determining an operational flow of operating system (OS) components, the algorithm selector logic circuitry comprising:

data retrieval logic circuitry configured to retrieve a targeted memory structure that stores an OS component of the OS components;

emulator logic circuitry configured to conduct emulation operations on the OS component;

trace generation logic circuitry configured to insert one or more intercept points at memory address offset locations that correspond to parameters within the targeted memory structure to generate a trace that records the parameters accessed and an order of access by one or more processes accessing the parameters of the OS component stored within the targeted memory structure at the memory offset locations where the one or more intercept points are inserted; and software component selection logic circuitry configured to compare an execution flow associated with the generated trace with known execution flows, the known execution flows are associated with different OS versions, wherein when correlations between the execution flow and the known execution flows fail to meet a prescribed level of correlation, the software component selection logic circuitry identifies the OS component may be compromised or further analytics of the OS component is required.

2. The algorithm selector logic circuitry of claim 1, wherein the targeted memory structure provided to the logic circuitry is a subset of memory structures for the OS components as detected by undocumented structure extractor logic circuitry or undocumented offset extractor logic circuitry.

3. The algorithm selector logic circuitry of claim 1, wherein when a correlation between the execution flow and a known execution flow exceeds the prescribed level of correlation, the software component selection logic circuitry identifies the OS component corresponds to an OS component that performs the known execution flow.

4. The algorithm selector logic circuitry of claim 3, wherein successive determinations of the execution flows of the memory structures enables formulation of a collection of actual OS components utilized by an OS of a targeted computing device relied upon for a memory audit.

5. The algorithm selector logic circuitry of claim 1 being part of an intelligence extraction system to conduct a memory audit that comprises (i) an undocumented structure extractor logic circuitry configured to identify known, but undocumented, memory structures associated with software installed on a targeted computing device and (ii) an undocumented offset extractor logic circuitry configured to identify undocumented and unknown memory structures associated with the software installed on the targeted computing device.

6. A computerized method comprising:
  retrieving a targeted memory structure that stores an OS component;
  conducting emulation operations on the OS component;
  inserting one or more intercept points at memory address offset locations that correspond to parameters within the targeted memory structure to generate a trace that records the parameters accessed and an order of access by one or more processes accessing the parameters of the OS component stored within the targeted memory structure at the memory offset locations where the one or more intercept points are inserted; and
  comparing an execution flow associated with the generated trace with known execution flows, the known execution flows are associated with different OS versions,
  wherein identifying the OS component may be compromised or further analytics of the OS component is required when correlations between the execution flow and the known execution flows fail to meet a prescribed level of correlation.

7. The computerized method of claim 6, wherein the targeted memory structure is a subset of memory structures for the OS components as detected by undocumented structure extractor logic circuitry or undocumented offset extractor logic circuitry.

8. The computerized method of claim 6, wherein identifying the OS component corresponds to an OS component that performs a known execution flow when a correlation between the execution flow and the known execution flow exceeds the prescribed level of correlation.

9. The computerized method of claim 8, wherein successive determinations of the execution flows of the memory structures enables formulation of a collection of actual OS components utilized by an OS of a targeted computing device relied upon for a memory audit.

10. An intelligence extraction system to conduct a memory audit, the intelligence extraction system comprising:
  logic circuitry configured to identify known, but undocumented, operating system (OS) components and undocumented and unknown OS components associated with software installed on a targeted computing device; and
  an algorithm selector logic circuitry configured to determine an operational flow of the OS components, the algorithm selector logic circuitry comprises
    data retrieval logic circuitry configured to retrieve a targeted memory structure that stores an OS component of the OS components,
    emulator logic circuitry configured to conduct emulation operations on the OS component,
    trace generation logic circuitry configured to insert one or more intercept points at memory address offset locations that correspond to parameters within the targeted memory structure to generate a trace that records the parameters accessed and an order of access by one or more processes accessing the parameters of the OS component stored within the targeted memory structure at the memory offset locations where the one or more intercept points are inserted, and
    software component selection logic circuitry configured to compare an execution flow associated with the generated trace with known execution flows, the known execution flows are associated with different OS versions,
  wherein when correlations between the execution flow and the known execution flows fail to meet a prescribed level of correlation, the software component selection logic circuitry identifies the OS component may be compromised or further analytics of the OS component is required.

11. The intelligence extraction system of claim 10, wherein the targeted memory structure provided to the emulator logic circuitry of the algorithm selector logic circuitry is a subset of memory structures for the OS components as detected by the logic circuitry.

12. The intelligence extraction system of claim 10, wherein when a correlation between the execution flow and a known execution flow exceeds the prescribed level of correlation, the software component selection logic circuitry identifies the OS component corresponds to an OS component that performs the known execution flow.

13. The intelligence extraction system of claim 12, wherein successive determinations of the execution flows of the memory structures enables formulation of a collection of actual OS components utilized by an OS of the targeted computing device relied upon for a memory audit.

* * * * *